United States Patent [19]

Finegan

[11] Patent Number: 4,918,682

[45] Date of Patent: Apr. 17, 1990

[54] ABLATIVE AND BUMP-FORMING OPTICAL RECORDING MEDIA INCLUDING A METALLIC REFLECTIVE LAYER

[75] Inventor: Joel D. Finegan, Campbell, Calif.

[73] Assignee: Tandy Corporation, Fort Worth, Tex.

[21] Appl. No.: 152,519

[22] Filed: Feb. 5, 1988

[51] Int. Cl.$^4$ .................................................. G11B 7/24
[52] U.S. Cl. .................................... 369/275; 369/100; 369/288
[58] Field of Search ............... 369/275, 100, 284, 286, 369/288; 346/76 L, 135.1, 77 E; 365/106, 126; 430/945, 270, 495

[56] References Cited

U.S. PATENT DOCUMENTS

| | | | |
|---|---|---|---|
| 4,371,954 | 2/1983 | Cornet | 365/126 |
| 4,405,994 | 9/1983 | Cornet et al. | 365/126 |
| 4,638,335 | 1/1987 | Smith et al. | 430/945 |
| 4,647,947 | 3/1987 | Takeoka et al. | 430/945 |
| 4,709,363 | 10/1987 | Dirks et al. | 369/275 |
| 4,719,615 | 1/1988 | Feyrer et al. | 369/100 |
| 4,756,811 | 7/1988 | Takeoka et al. | 430/270 |
| 4,780,867 | 10/1988 | Lind et al. | 369/100 |

FOREIGN PATENT DOCUMENTS 0136070 8/1984 European Pat. Off. .
60-34896 2/1985 Japan .

OTHER PUBLICATIONS

J. S. Hartman et al., Erasable Bilayer Dye-Polymer Optical Recording Medium, pp. 155-158. Publication date of this article is unknown.
S. Miyaoka, Digital Audio is Compact and Rugged, IEEE Spectrum, Mar. 1984, pp. 35-39.

Primary Examiner—Steven L. Stephan
Assistant Examiner—Hoa Nguyen

[57] ABSTRACT

Optical data storage media of various technologies, particularly those with multiple layers of varying absorptivities of light include at least one polymer layer and a metal reflective layer. The metal reflective layer is constructed of an elemental metal or metal alloy having the desired reflective properties and which also softens or melts or both at, near or below the temperature reached by the polymer layer during recordation.

28 Claims, 1 Drawing Sheet

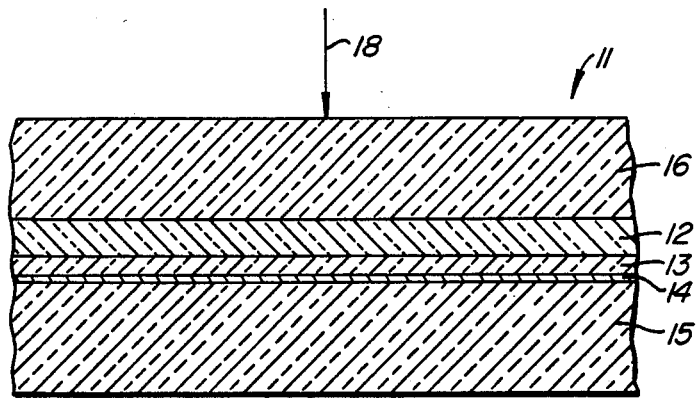
FIG.—1.
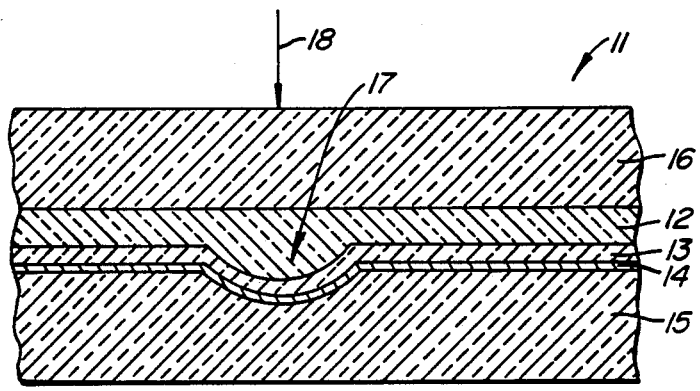
FIG.—2.

ABLATIVE AND BUMP-FORMING OPTICAL RECORDING MEDIA INCLUDING A METALLIC REFLECTIVE LAYER

This invention relates to optical data storage media on which data are recorded by response to the thermal effects of absorbed light. In particular, this invention is directed to recordable discs including a metal reflective layer for reflecting a wavelength of light through the recorded disc.

BACKGROUND OF THE INVENTION

Optical data storage media include a broad range of materials and signal mechanisms, and include media in which recording takes place before media production ("read-only"). media on which data can be directly recorded and becomes permanently fixed ("write-once"), and media which can be both recorded upon and erased and re-recorded ("erasable"). Optical signals fall within three general categories: reflective, transmissive and absorptive. These signals may be produced in a variety of ways, including bump-forming media in which pits (or bumps) are formed in certain layers of the media; optical density change materials (such as photographic films, photoresists and photopolymers, which undergo optical density changes upon absorption of light); phase-change materials (undergoing a transition from a crystalline to an amorphous state or vice versa upon absorption of light); magneto-optical materials (where signals are recorded by localized heating under a magnetic field to change the direction of magnetization); and ablative thin films (where the recorded pattern induces light amplitude modulation).

Many of these techniques are examples of thermo-optical recording, in which light from a laser is focused to a small, usually diffraction limited spot at a specified depth in the medium. The energy from the focused light heats the spot and effects the change which functions as data storage.

The construction of the medium will vary depending on the type of signal to be recorded on it or built into its structure during fabrication. Optical media in general are of multilayer construction. Ablative media form a single layer of polymer which may be coated with a metal reflective layer. Bump-forming media have a multi-layer construction, also including a metal reflective layer.

Examples of optical data storage media which include layers of differing absorptivity are those described in European Patent Application Publication No. 136070, published on Apr. 3, 1985, entitled "Erasable Optical Data Storage Medium and Method and Apparatus for Recording Data on the Medium" (Optical Data, Inc.); and U.S. patent application Ser. No. 153,288, filed concurrently herewith, inventors B. Clark. J. Finegan and R. Guerra, having the same assignee as named herein, entitled "Optical Data Storage Media for Substrate Incident Recording." In such media, binary optical data appear as pits or bumps in an otherwise flat reflecting surface, which may be either a partially reflecting interface between two layers of different refractive indices, or a fully reflecting surface such as a metallic film.

Applications of dye-polymer technology to recording media are intended for a playback on optical players such as Compact Discs (R) audio players, Laser-vision (R) video players and CD-ROM computer systems. These applications require that the media have a reflectance of greater than 70at the wavelength of the playback laser, the wavelength typically being 780 nm. Commercially produced pre-recorded discs meet this requirement by the use of aluminum, or, occasionally, gold vacuum deposited or sputtered over the recorded information. Experimental recordable dye-polymer media have also used aluminum or gold, whether the principle of operation is ablative or bump-forming. These two types of dye-polymer media, however, have different requirements with respect to the metal reflective layer.

In the ablative media, when the polymer layer is removed by the action of the recording laser, the metal layer must be removed over exactly the same area as the polymer. This is necessary to insure that the contrast between the reflective unrecorded and the recorded mark is great enough to be detected by the playback system. By removing the metal layer with the polymer layer, the change in contrast between the recorded and unrecorded areas is more easily detectable.

Difficulties arise with the use of aluminum or gold because under typical conditions, an extremely high temperature is required to remove the metal reflective layer along with the polymer layer. It is difficult to control melting of the reflective layer. In addition, if the metal layer is removed, blasting will result in ragged edges.

In bump-forming media, when the polymer layer is deformed, the metal layer must be deformed simultaneously by the forces created in the two-layer structure by the recording laser. The deformation must be great enough to permit the bump to be detected by the playback system. Again, aluminum and gold are difficult to deform in this manner.

Computer models have shown that temperatures in the polymer layers at the points of focus of the recording laser under typical recording conditions are around 800° C. Since the reflective layer is a small distance from the focal point, of course, the temperature in the reflective layer is somewhat lower. The metals normally used in reflective layers of the prior art (where they are used in read-only media), however, are not sufficiently responsive at these temperatures, particularly at the thicknesses needed to achieve good reflectivity. One must therefore use beams of higher intensity to achieve sufficient energy in the reflective layer to record a mark.

Because the semi-conductor laser diodes typically used in optical recorders have power limitations and an operating life highly dependent upon the power generated during operation, it is highly desirable to reduce the power needs of the media.

SUMMARY OF THE INVENTION

A novel optical data storage medium is disclosed herein which overcomes the disadvantages of the prior art. The medium includes a reflective layer formed from alloys or elemental metals (collectively referred to herein as "metallic materials") which either soften or melt (or both) at a temperature in the vicinity of or below the peak temperature reached by the polymer layers during recordation under conventional recordation conditions. The reflective layer is accordingly soft and malleable at the recordation temperatures.

Materials meeting this description satisfy the requirements of the reflective layer for both the ablative media and bump-forming media systems. With reflective layers of these materials, the temperature needed to blast or deform the reflective layer is lower, and consequently, the power requirements of the semi-conductor laser diodes are reduced. At the same time, the highly reflective properties of the metal material is retained. This assures that there will be enough energy at or adjacent to the reflective layer to achieve the desired deformation.

BRIEF DESCRIPTION OF THE DRAWINGS

FIG. 1 is a cross-sectional view of an example of bump-forming medium in accordance with the present invention.

FIG. 2 is a cross-sectional view of the medium of FIG. 1 with data recorded therein.

DETAILED DESCRIPTION OF THE INVENTION AND PREFERRED EMBODIMENTS

The functional layers in data recordation in accordance with the present invention may be applied to either of two types of dye-polymer media, i.e., ablative media or bump-forming media. In addition to the polymer layer in each of the systems, a metal reflective layer is present adjacent to the polymer layer.

An example of a bump-forming medium 11 is shown in the Figures, in which the layers include an expansion layer 12, a retention layer 13, and a reflective layer 14.

The expansion layer is formed of a material which is absorptive of light at the wavelength of the record beam. The expansion layer is only partially absorptive at this wavelength, thereby permitting a double pass of the record beam. The degree of absorptivity may vary, although in general, a double pass absorption of about 40% or greater will provide the best result. The expansion layer is at least partially transmissive of light at the wavelength of the erase beam. Although this may vary widely as well, in most applications a transmissivity of at least about 60% at this wavelength will provide the best results. A double pass absorption of around 50% helps to create a column of nearly constant temperature material in the expansion layer. Eliminating high thermal gradients through the expansion layer that occur with single pass recording. This improves mark formation and definition.

The expansion layer is further categorized by a high coefficient of thermal expansion, particularly when compared to other layers of the medium. The expansion layer material is rubbery at ambient temperature, having a high coefficient of elasticity. to the extent that it will expand readily during recordation without exceeding its upper expansive limit. When at room temperature, the expansion layer material is above its glassy transition temperature, which is preferably below 30° C.

The retention layer has a set of characteristics distinct from those of the expansion layer. The retention layer is absorptive of light at the wavelength of the erase beam. The wavelengths of these two beams differ in a non-overlapping manner. The absorptivity of light by the retention layer at the erase beam wavelength is preferably at least about 40%. In addition, the retention layer material is transmissive of light at the wavelength of the record beam, preferably at least about 60%.

The retention layer material has a glass transition temperature which is above ambient temperature. This may be below the temperature reached by the expansion layer during recordation. However, with direct heating of the retention layer, by absorption of light from the record beam, this need not be so. When above the glass transition temperature, the material is rubbery with a high enough elasticity, sufficient to permit it to deform to the contour of the distortion formed in the expansion layer without exceeding its elastic limit.

The reflective layer serves to reflect light back through the expansion layer for purposes of recordation, and also for purposes of data detection. The reflection layer is thus highly reflective, preferably reflecting at least about 85% of the light striking it during both recordation and reading. The reflective layer is also deformable so that it conforms to the shape of the bump representing the recorded data for purposes of light scattering.

The storage medium may also include a protective layer 15 at the underside of the bumps to protect them from damage due to contact with external objects. Characteristic of the protective layer is its compliancy, by which it deforms to permit the bumps to protrude into it. In addition, the compliant layer is relatively thick when compared to the expansion, retention and reflective layers, such that the bumps are not transmitted through the protective layer to its outer surface. It is also preferred that the protective layer have a high thermal conductivity to enable it to function as a heat sink for purposes of rapid cooling of the retention layer immediately after formation of the bumps.

The various layers are arranged on the substrate 16 with the the expansion layer adjacent to the substrate, and the retention and reflective layers on the side of the expansion layer away from the substrate. The substrate itself is formed of a rigid transparent material which permits substantially full transmission of light of all three wavelengths; record, read and erase. The substrate is sufficiently thick and rigid to provide structural integrity to the medium, and does not deform in response to pressure caused by expansive forces in the expansion layer. Bulges 17 in the expansion layer caused by ,thermal expansion upon absorption of the record beam 18 protrude away from the substrate due to the rigidity of the substrate. With this layer arrangement, the bumps protrude into the retention and reflective layers, causing their deformation as described above.

The power required by the semi-conductor laser diodes can be reduced by lowering the temperature required to deform the metal film, while retaining the highly reflective properties. Therefore, the metal layer is comprised of an alloy or elemental metal whose melting point is less than 200° C. and is soft and malleable at room temperature. The optimum temperature reached in the reflective layer is related to the conduction from the adjacent polymer layer. This optimum temperature will be slightly above or below the melting point of the metal.

In accordance with the invention, alloys or elemental metals of low melting points are used as the reflective layer. Pure indium yields favorable results. In some cases, however, the large grain structure of indium produces less than optimal results, notably noise during playback. When the indium is combined with other materials, a finer grain structure results, reducing or eliminating the noise. A preferred combination is indium plus bismuth reducing the melting point to approximately 150° C. A eutectic alloy of bismuth with other metals, such as tin, cadmium or indium, for example, will result in a melting point within the desirable range.

The material used for the reflective layer in the present invention either softens or melts (or both) in the desirable range of favorable recordation conditions (about 800° C. or less). These coatings have the required thermal-mechanical properties. Additionally, they do not discolor or show undesirable optical deterioration due to oxidation or use.

A particular advantage of the two-layer bump-forming dye polymer media is that information can be erased by heating the retention layer as described in European Patent Application No. 136070, published on Apr. 3, 1985, entitled "Erasable Optical Data Storage Medium And Method And Apparatus For Recording Data On The Medium" (Optical Data, Inc.); and U.S. patent application Ser. No. 153,288, filed concurrently herewith, and referenced above. Erasing of the information requires that the surface of the metal layer return to its original flatness along with the dye polymer coatings. The metal must therefore be either soft and malleable and firmly attached to adjacent polymer layers, or molten in order to permit a flat metal surface to reform over the polymer layer when the bump is removed by the erasing beam. The materials of the present invention ensure this result.

The ablative media process in which the polymer layer is removed by the action of the recording laser also includes a metal reflective layer on the opposite side of the polymer from the incident recording beam. This insures sufficient contrast between the reflective unrecorded surface and the recorded area to be detected by the playback system. The power needs of the ablative media can be reduced by lowering the temperature required to blast the metal film, while retaining the highly reflective properties of the metal.

The absorptive characteristics of the various layers may be imparted thereto in conventional ways, preferably by the inclusion of dyes or pigments selected to absorb the appropriate wavelength. The target wavelengths are not critical, and can vary depending on the types of laser available for use. The wavelengths will generally be selected such that the record and erase wavelengths are distinct and non-overlapping. The layers may, however, be formulated with some overlap in absorption characteristics. The erased dye in the retention layer of the bump-forming media, for instance, may be slightly absorbing at the record wavelength. This will result in direct heating of the retention layer during recordation as well as erasure. Typical wavelengths by which lasers are available are 680 nm, 780 nm and 840 nm. Examples of dyes or pigments which may be used are nigrosin blue, aniline blue, Calco Oil Blue, ultramarine blue, methylene blue chloride, Monastral Blue, Malachite Green Ozalate, Sudan Black BM, Tricon Blue, Macrolex Green G, DDCI-4 and IR26.

The various layers are bonded together according to conventional techniques. It is preferred that adjacent layers be optically coupled to one another such that substantially all light propagated through one layer enters the adjacent layer. The exception is the reflective layer which reflects a major portion of light incident upon it.

The media of the present invention may be fabricated in accordance with conventional techniques, whereby the various layers are applied in succession by coating over a substrate. Knife-spread techniques, spin-coating techniques and metal vapor depositions are examples of techniques which may be used.

The foregoing is offered primarily for purposes of illustration. It will be readily apparent to those skilled in the art that variations in the materials, their physical arrangements, and the various system parameters described herein may be introduced without departing from the sphere and scope of the invention.

What is claimed is:

1. A storage medium including a reflective layer, said storage medium including at least one polymer layer being deformable by a recording laser having a point of focus directed on said polymer layer, said polymer layer reaching a temperature at said point of focus during recordation, said reflective layer comprising a reflective metallic material which softens or melts at or below said temperature of said polymer layer, wherein said reflective metallic material has a melting point less than 200° C.

2. The storage medium as defined by claim 1 wherein said reflective metallic material is soft and malleable at room temperature.

3. The storage medium as defined by claim 1 wherein said reflective metallic material is indium in substantially its purest state.

4. The storage medium as defined by claim 1 wherein said reflective metallic material is an alloy of indium and bismuth.

5. The storage medium as defined by claim 1 wherein said reflective metallic material is a eutectic alloy of bismuth.

6. The storage medium as defined by claim 1 wherein the deformation so produced in said polymer layer by said recording laser comprises a protrusion on said polymer layer.

7. The storage medium as defined by claim 1 wherein the deformation so produced in said polymer layer by said recording laser comprises a hole formed in said polymer layer.

8. A storage medium including at least one polymer layer and a metal layer, said polymer layer being deformable by a first force generated by a recording laser and reformable by a second force generated by an erasing laser, said metal layer comprising a malleable layer deformable by said first force and reformable by said second force, wherein said metal layer comprises a material having a melting point less than 200° C.

9. The storage medium as defined by claim 8 wherein said malleable layer is readily deformable and reformable during generation of said recording and erasing lasers, respectively.

10. The storage medium as defined by claim 8 wherein said metal layer comprises a metallic material which is soft and malleable at room temperature.

11. The storage medium as defined by claim 8 wherein said metal layer is indium in substantially its purest state.

12. The storage medium as defined by claim 8 wherein said metal layer is an alloy of indium and bismuth.

13. The storage medium as defined by claim 8 wherein said metal layer comprises a eutectic alloy of bismuth.

14. The storage medium as defined by claim 8 wherein the deformation so produced by said first force comprises a protrusion on said polymer layer.

15. The storage medium as defined by claim 8 wherein the deformation so produced by said first force comprises a hole formed in said polymer layer.

16. A storage medium mounted on a rigid substrate in which optical data can be recorded through said substrate by a record light beam and from which data so recorded can be read by a read light beam reflected back through said substrate into a detection system designed to read signals reflected through a layer which is substantially the optical equivalent of said rigid substrate, said storage medium comprising:

an expansion layer optically coupled to said substrate along an interface therebetween and expandable upon heating to a peak temperature to form protrusions on the surface thereof opposite said interface;

a reflective layer which reflects a portion of the light striking it and is sufficiently elastic to conform to the contour of said surface, said reflective layer being comprised of a metallic material which softens or melts at or below the peak temperature reached by the remaining layer or layers during a normal process of recording information, wherein said reflective layer comprises a material having a melting point less than 200°.

17. The storage medium as defined by claim 16 further comprising means for retaining protrusions so formed in said expansion layer upon cooling thereof, said retaining means comprising a retention layer comprised of material which has a glass transition temperature substantially above ambient temperature and thereby converts from a glassy state at ambient temperature to a rubbery state at a temperature above said glass transition temperature.

18. The storage medium as defined by claim 17 wherein optical data recorded on said storage medium is erasable by an erase beam absorbed by said retention layer, increasing the temperature thereof sufficiently to convert said retention layer to its rubbery state resulting in forces returning the retention layer to its original, unrecorded state.

19. The storage medium as defined by claim 16 wherein said reflective layer reflects at least about 75% of the light striking it.

20. The storage medium as defined by claim 16 wherein said reflective layer comprises a material which is soft and malleable at room temperature.

21. The storage medium as defined by claim 16 wherein said reflective layer is indium in substantially its purest state.

22. The storage medium as defined by claim 16 wherein said reflective layer is an alloy of indium and bismuth.

23. The storage medium as defined by claim 16 wherein said reflective layer is a eutectic alloy of bismuth.

24. A storage medium comprising at least one dye polymer layer and a reflective layer adjacent to said polymer layer in which optical data is recordable onto said storage medium by a recording laser having a point of focus directed on said polymer layer, said polymer reaching a temperature at said point of focus during recordation, wherein data is stored by controlled destruction of portions of said polymer layer, and wherein optical data so recorded is readable by a road light beam, said reflective layer comprising a reflective metallic material which softens or melts at or below said temperature of said polymer layer, wherein said reflective metallic material has a melting point less than 200° C.

25. The storage medium as defined by claim 24 wherein said reflective metallic material is soft and malleable at room temperature.

26. The storage medium as defined by claim 24 wherein said reflective metallic material is indium in substantially its purest state.

27. The storage medium as defined by claim 24 wherein said reflective metallic material is an alloy of indium and bismuth.

28. The storage medium as defined by claim 24 wherein said reflective metallic material is a eutectic alloy of bismuth.

* * * * *